United States Patent [19]

McArthur

[11] 4,010,642

[45] Mar. 8, 1977

[54] BOREHOLE PRESSURE MEASUREMENT

[75] Inventor: Billy W. McArthur, Wallis, Tex.

[73] Assignee: Sperry-Sun, Inc., Sugar Land, Tex.

[22] Filed: Aug. 22, 1975

[21] Appl. No.: 606,911

Related U.S. Application Data

[63] Continuation-in-part of Ser. No. 467,349, May 6, 1974, abandoned.

[52] U.S. Cl. .................................. 73/151; 73/302
[51] Int. Cl.² ..................................... E21B 47/04
[58] Field of Search ............ 73/151, 152, 155, 302

[56] References Cited

UNITED STATES PATENTS

| | | | |
|---|---|---|---|
| 2,855,780 | 10/1958 | Edwards | 73/152 X |
| 3,572,121 | 3/1971 | Kesseru et al. | 73/302 |
| 3,712,129 | 1/1973 | Rhoades | 73/151 |
| 3,827,295 | 8/1974 | Rochon et al. | 73/155 |
| 3,874,231 | 4/1975 | Walther, Jr. | 73/151 |

*Primary Examiner*—Jerry W. Myracle
*Attorney, Agent, or Firm*—Macka L. Murrah

[57] ABSTRACT

A pressure measurement system particularly suited to use in boreholes uses a pressure source at the surface to supply a test fluid through a small tube to a large downhole chamber having a fluid port on its bottom side. The test fluid displaces borehole fluid from the chamber after which the pressure of the test fluid is measured at the surface, thereby indicating the pressure of the borehole fluid.

22 Claims, 4 Drawing Figures

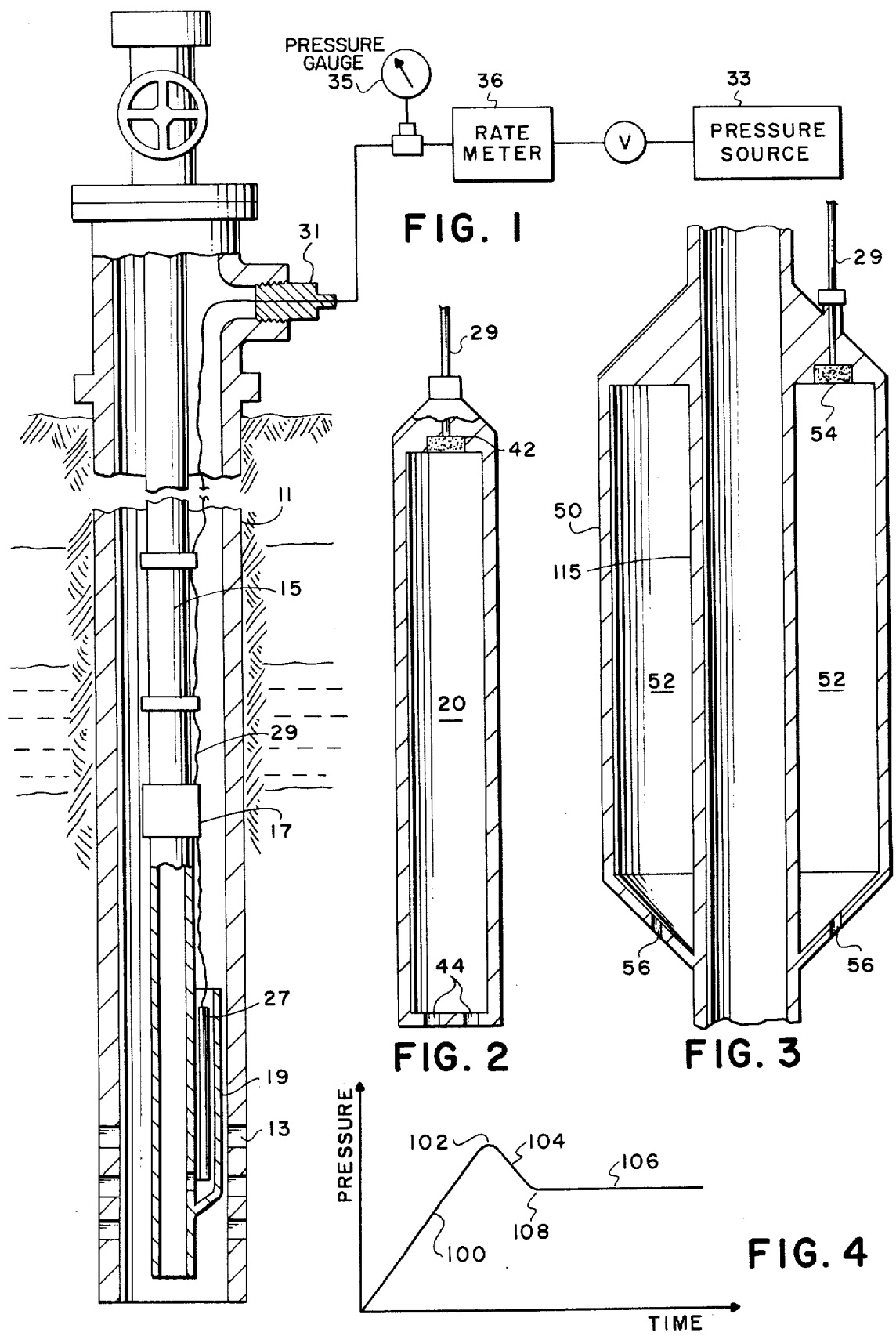

BOREHOLE PRESSURE MEASUREMENT

This application is a continuation-in-part application of U.S. Ser. No. 467,349 filed May 6, 1974, now abandoned.

BACKGROUND OF THE INVENTION

The invention is related to applications bearing Ser. No. 414,060 entitled "PRESSURE MEASURING SYSTEM" which was filed November, 1973 now U.S. Pat. No. 3,895,527, and Ser. No. 414,062 entitled "METHOD AND APPARATUS FOR MEASURING PRESSURE RELATED PARAMETERS" which was filed November, 1973 now U.S. Pat. No. 3,898,877.

The invention relates to the measurement of fluid pressure at a remote location and is of particular application to measurement of pressures in a borehole.

The pressures of fluid in boreholes are particularly important in the production of oil and gas. Secondary recovery operations, for example, require pressure information to determine a number of factors necessary to the success of the operations.

Preliminary to the secondary recovery operations borehole pressures give an indication of well productivity potential and the amount of fluid that will be required to "fill up" the space in the formation before oil and gas will begin to be forced out. During operations the measurement of pressure changes in a number of boreholes in a formation indicate the location of injection fluid flood fronts as well as the efficiency with which the flood front is sweeping through the formation.

In addition to secondary recovery operations, borehole pressures are important in other areas of oil and gas production. For example, pressure measurements may be used to indicate wellbore damage or any number of other problems in pumping wells.

The invention provides substantial improvement over previous methods of borehole pressure measurement. Some previous methods provided only periodic measurements, which are not only inconvenient and time consuming due to the necessity of inserting instrumentation into the borehole at each measurement but also incomplete in the representation of borehole conditions. An example of this type of system is disclosed in U.S. Pat. No. 3,712,129 to Rhoades. Each time a pressure measurement is desired, Rhoades charges an open-ended tube with a gas until the gas bubbles from the bottom of the tube. The pressure in the tube at the surface at which bubbling begins is the pressure of the borehole fluids. In contrast the present invention is capable of providing continuous pressure information.

Other bubble tube systems using the principle of pressure equalization include U.S. Pat. No. 1,289,755 to Haynes, which relates to measuring the depth of water. The Haynes apparatus uses a tube having an enlarged sleeve on its lower end. The tube and sleeve containing air at atmospheric pressure are lowered into the water. Shortly after the tube enters the water, a pressure storage tank begins to automatically supply pressurized air to the tube through a spring-loaded valve. The spring tension is initially overcome by the sleeve, which collects a larger volume of air and has a larger cross-sectional area than the tube. Since force equals pressure times area, the larger area of the sleeve cross-section allows the air therein to be forced into the tube at a lower water pressure. This permits the valve to be opened at a shallower water depth measurement to thereby begin.

As the tube is lowered into the water, the air therein is compressed by the force of water pressure, which delays the opening of the valve. In order to make the valve opening closely follow movements of the lower end of the tube, the compression must be compensated. This can be done by increasing the volume of air in the tube. This extra volume of air is provided by the sleeve. The sleeve is used only when the tube is initially placed in the water and plays no part thereafter. It does not prevent water from entering the upper part of the tube, nor does it act to maintain the water level near the bottom of the tube in order that pressures measured closely reflect those at the bottom thereof. The pressures are measured at different depths at the pressure required to bubble the air from the bottom of the tube, not at a pressure at which the water level is higher in the tube than the bottom thereof.

A number of other pressure measuring devices have been devised to overcome the problems inherent in periodic measurement by providing for permanent installation in producing wells. One such device operates with a downhole pressure transducer having an electronic scanning system for converting downhole pressure into the data transmittable to the surface on a conductor cable. The cable is normally attached to the outside of the tubing and the transducer is mounted on the lower end of the tubing string. The electronics in such a system is expensive and produces maintenance problems stemming in part from high temperatures and corrosive fluids often present in boreholes. In addition, an electronic system using scanners and transmitting such data over conductors is subject to problems of maintaining a high resolution, and thus data may not be as accurate as needed to determine changes in reservoir conditions. In addition, downhole pressure transducers are often intricate in design and thus are subject to the hostile pressure, temperature and chemical fluids environment of wellbores.

It is therefore an object of the present invention to provide a new and improved apparatus for detecting a borehole pressure.

SUMMARY OF THE INVENTION

In accordance with the invention, a tube, preferably a microtube, having a chamber attached to the lower end thereof is lowered into the borehole into the area where fluid pressures larger than normal hydrostatic pressures are to be measured. The lower end of the chamber is open and the volume of the chamber is preferably substantially larger than that of the tube. The chamber is partially filled, preferably to about one-half its volume, through the tube from the surface with a test fluid by a pressurized fluid source, and the tube is sealed to prevent escape of the fluid. The entry of the test fluid partially displaces borehole fluids from the chamber. The chamber is partially filled by observing the pressure of the fluid in the tube at the surface by observing the rate of pressure increase in the tube. Pressurization is ceased after a decrease occurs in the rate of pressure increase but before the rate of increase drops to zero. Thereafter pressure changes may be continuously measured over an extended period by observing the pressure of the test fluid in the tube at the surface.

The volume of the chamber is dictated by the maximum and minimum pressures that are to be measured.

The preferable minimum ratio of the chamber volume to the tube volume is equal to the difference between the maximum pressure to be measured and the minimum pressure divided by the minimum pressure.

BRIEF DESCRIPTION OF THE DRAWINGS

The invention may be more fully understood by considering a detailed description of the invention in conjunction with the following drawings:

FIG. 1 is a partial cross-sectional view of the wellbore and production equipment, including a pressure measuring system in accordance with the present invention;

FIG. 2 is a cross-sectional view of the downhole pressure measuring equipment shown in FIG. 1;

FIG. 3 is an alternative embodiment of the downhole pressure measuring equipment; and FIG. 4 is a graph of the behavior of pressure with respect to time in the apparatus.

DETAILED DESCRIPTION OF THE INVENTION

The use of the invention in connection with a borehole is shown in FIG. 1 in which a wellbore is shown extending into underground formations. Production equipment for producing fluids from the formation is shown schematically and includes a casing 11 in the wellbore having perforations 13 at its lower end to permit the entry of formation fluid. A tubing string 15 extends from a wellhead at the surface downwardly within the borehole to the lower end thereof. Spacers 17 are provided in the tubing string to maintain the tubing centered in the borehole. A mandrel 19 is shown attached to the lower end of the tubing to provide a seat for a downhole pressure probe 27. The downhole pressure measuring probe 27 is shown positioned in the mandrel at the lower end of the tubing. The small diameter hollow tube 29 extends from within the pressure measuring probe. Tube 29 as used in the present system if typically 0.026 inches and 0.054 inches. Tubing in this range is generally known in the art as microtubing. The tube is positioned on the outside of the tubing string and extends to the surface where it exits on the side of the wellhead on a fitting 31. Connected to the tube 29 at the surface is a fluid pressure source 33, which may be a bottle of pressurized gas, and a pressure indicating device 35. A rate meter 36 is shown in the system to measure the rate of pressure change when pressure is applied to the system. The rate may be determined by any sort of device that measures pressure as a function of time. Thus, as pressure is charted versus time or printed out in a timed sequence, this will serve to establish a rate of pressure change.

The particular embodiment of the downhole probe 27 is shown in more detail in FIG. 2. Probe 27 is an enclosed chamber having two ports through which fluid can communicate with its interior. At the upper end tubing 29 provides communication between the probe chamber and the surface. A filter 42 that may be made of a porous metallic material prevents foreign material from communicating between the probe 27 and tube 29. At the bottom of probe ports 44 allow borehole fluid to enter and exit the probe chamber.

An alternative embodiment of the downhole probe is shown in FIG. 3. A cylindrical shell 50 is disposed concentrically about tubing string 115 and attached thereto at its top and bottom to form an enclosed chamber 52 between the cylindrical shell 50 and the tubing string 115. Chamber 52 communicates with the surface at its upper end through porous filter 54 and tubing 29. Borehole fluids communicate with chamber 52 by means of ports 56 located at the bottom end of the probe.

The volume of the chamber in the probe must generally be much larger than that of the tube connecting the probe to the surface equipment. The larger size operates to scale down vertical fluid movement in the chamber in the tube resulting from pressure changes. If only a small tube were used, even a very small pressure change in the borehole would cause fluid to rise a considerable distance through the tubing toward the surface. Larger pressure changes would cause borehole fluids to be forced entirely through the borehole into the surface equipment. In a chamber of large volume, however, a change in pressure, although forcing upward the same volume of fluid as in the previous case, will cause a much smaller change in fluid level due to the much larger volume of the chamber. The volume of chamber required can be calculated from the following:

$$[\text{Volume of Chamber}] = \frac{[\text{Maximum pressure}] \times [\text{Volume of Tube}]}{[\text{Minimum of pressure}]} - [\text{Volume of Tube}]$$

The ratio of the volume of chamber to the volume of the tube can thus be expressed as:

$$\frac{[\text{Maximum pressure}] - [\text{Minimum pressure}]}{\text{Minimum pressure}}$$

The test fluids supplied by the pressure source may be any of a various number of fluids of which nitrogen is one that has been found particularly suitable.

In the operation of the apparatus thus far described, the tube and chamber are filled with pressurized test fluid from pressure source 33. The point at which the tube or chamber are filled may be determined by monitoring the pressure of the test fluid with the pressure gauge 35. If the pressure of the test fluid is plotted versus time, a characteristic curve like that in FIG. 4 will be produced, if the tube and chamber are filled at a constant rate. The pressure will steadily increase from zero along portion 100 of the curve in FIG. 4 until it reaches a peak 102. At peak 102 the pressure of the test fluid will have become sufficiently large to begin displacing borehole fluid from the chamber 29 in probe 27 (FIG. 2). After the test fluid has begun to displace the borehole fluid, the pressure will begin dropping in portion 104 of the characteristic curve. The volume occupied by the test fluid increases as a borehole fluid is displaced. After the borehole fluid has been totally displaced test fluid will begin itself escaping from points 44 to prove 27, and the pressure of the test fluid will not be able to change further. This is shown as portion 106 as the characteristic curve. Point 108 of the curve is a point at which chamber 29 is filled with the test fluid. A portion of the test fluid may then be removed such that the chamber is approximately one-half filled. Alternatively, the tube and chamber may be pressurized until after a drop in the rate of pressure increase is measured, and the pressurization ceased before the rate drops to zero. The system is locked in at point 108 by sealing tube 29 at the surface, and thereafter changes in borehole pressure may be read directly from pressure gauge 35.

Continuous pressure measurement over a range of pressure variations without recharging the system are made possible by the chamber. The large volume minimizes the variation in fluid level in the chamber as borehole fluid pressure varies. This provides two advantages. First, corrosive borehole fluids and clogging debris are not blown up into the tube and surface equipment when borehole pressure increases. Second, the pressure measured at the surface, and thus the pressure at the level of the fluid in the chamber, is always very close to the pressure at the level of the fluid in the borehole outside the chamber.

The chamber is preferably filled to one-half its volume with the test fluid, leaving the remainder filled with borehole fluids in order that the borehole pressure can fluctuate over equal ranges upwardly and downwardly. Alternatively, the test fluid can be biased to any level in the chamber if general decreases or increases in pressure are anticipated.

While particular embodiments of the present invention have been shown and described, it is apparent that changes and modifications may be made without departing from the true spirit and scope of the invention. It is therefore the intention in the appended claims to cover all such changes and modifications.

What is claimed is:

1. Pressure measuring apparatus for extended, continuous use in boreholes in which the pressure is greater than the normal hydrostatic pressure, comprising:
   a source of a pressurized test fluid at the surface for initially charging the apparatus;
   a tube connected to the fluid source and extending into the borehole to a location where pressure is to be measured;
   a chamber having a volume substantially larger than that of the tube and the ratio of which to the volume of the tube is at least equal to the ratio of the difference between the maximum and minimum anticipated pressures in the borehole to the minimum anticipated pressure, said chamber being connected on its upper side to the tube and having on its lower side ports open to the borehole environment, said chamber thus being sized to prevent borehole fluids and debris from being forced into surface apparatus and to allow pressure measurement despite pressure fluctuations; and
   means at the surface for measuring the pressure of the test fluid.

2. Apparatus for continuously measuring over an extended period pressure changes in boreholes having pressures greater than the normal hydrostatic pressure, comprising:
   a pressure source at the surface for initially charging a portion of the apparatus;
   a tube connected to the pressure source and extending into the borehole;
   a chamber in the borehole in communication with the tube, said chamber having a volume substantially larger than that of the tube and that bears a predetermined relationship to the volume of the tube and having port means open to the borehole environment, said chamber thus being sized to prevent borehole fluids from being forced into surface apparatus and to allow pressure measurement despite pressure fluctuations; and
   means at the surface for measuring the pressure of the test fluid.

3. Apparatus of claim 2 wherein the relationship of the chamber volume to the volume of the tube is equal to the ratio of the difference between the maximum and minimum anticipated pressure in the borehole to the minimum anticipated pressure.

4. Apparatus for continuously measuring over an extended period the pressure of a fluid at a desired location in a borehole having a pressure greater than the normal hydrostatic pressure comprising:
   a chamber for positioning in the borehole fluid, said chamber having an opening to allow communication of borehole fluids with the interior of the chamber;
   a tube in communication with the interior of the chamber on its upper side and extending to the surface, the volume of said tube being substantially smaller than said chamber and bearing a predetermined relationship to the volume of the chamber said chamber thus being sized to prevent borehole fluids and debris from being forced into surface apparatus and to allow pressure measurement at the desired location despite pressure fluctuations;
   a source of test fluid for initially charging a portion of said chamber through said tube at the surface in communication with the tube; and
   means at the surface for continuously measuring the pressure of the test fluid.

5. Apparatus of claim 4 wherein the relationship of the volume of the tube to the volume of the chamber is expressed as: the volume of the chamber is equal to the difference between the ratio of the product of the maximum anticipated pressure in the borehole and the volume of the tube to the minimum anticipated pressure in the borehole and the volume of the tube.

6. Apparatus for measuring the borehole fluid pressure in flowing, pumping and static fluid wells wherein the pressure is greater than the normal hydrostatic pressure, said apparatus comprising:
   an enlarged chamber for positioning within said borehole at a location adjacent the desired pressure measurement, said chamber being in communication with well fluids near its lower portion; a tube extending from communication with said chamber near its upper portion to the surface of said borehole, the volume of said tube being substantially less than the volume of said chamber;
   and means for initially charging said tube and a portion of chamber volumes with the gaseous fluid to exhaust a portion of the fluids from within said system and provide a long term continuous indication of borehole pressure at said location regardless of fluctuations therein and inhibit wellbore fluids from entering said tube.

7. Apparatus for continuously measuring over an extended period the pressure of fluids in a borehole at a desired location, said pressure being greater than the normal hydrostatic pressure and subject to fluctuations, comprising:
   a chamber for positioning in the borehole at the desired location, the chamber being in communication with the fluids near its lower portion;
   a tube in fluid communication with said chamber near its upper portion and extending to the surface of the borehole, the tube being substantially smaller in volume than the volume of said chamber to prevent entry of said fluid and debris into said tube during pressure fluctuations and to insure that the measured pressure corresponds to the pressure at the desired location over a wide range of pressure fluctuations;

means at the surface for initially charging said tube and a portion of said chamber with a gaseous fluid to exhaust said borehole fluid from said tube and a portion of said chamber; and means for sealing said tube after charging to prevent escape of the gaseous fluids through said tube.

8. Apparatus for continuously measuring the pressure of fluids in a borehole as set forth in claim 7, further including means at the surface for indicating the pressure of said gaseous fluid in said tube.

9. Apparatus for continuously measuring over an extended period the pressure of fluids in a borehole at a desired location as said fluids are being withdrawn from the borehole, said pressure being greater than the normal hydrostatic pressure and subject to fluctuations, comprising:

a production tubing string in the borehole;

a chamber comprising an annular space surrounding said tube string at the desired location, the chamber being in communication with the fluids near its lower portion;

a tube in fluid communication with said chamber near its upper portion and extending to the surface of the borehole, the tube being substantially smaller in volume than the volume of said chamber to prevent entry of said fluid into said tube during pressure fluctuations and to ensure that the measured pressure corresponds to the pressure at the desired location over a wide range of pressure fluctuations;

means at the surface for initially charging said tube and a portion said chamber with a gaseous fluid to exhaust said borehole fluids from said tube and a portion of said chamber, and means for sealing said tube to prevent escape of the gaseous fluids through said tube.

10. Apparatus for continuously measuring the fluctuating pressure of fluids in a borehole over an extended period, comprising:

a chamber positioned in the borehole fluids at a fixed depth, the interior of the chamber being in communication with said borehole fluids on its lower side;

a sealed tube in fluid communication with the upper side of said chamber and extending to the surface, said tube being substantially smaller in volume than said chamber;

a test fluid filling the tube and a portion of the volume of said chamber; and means at the surface in fluid communication with said tube for sensing the fluid pressure therein.

11. The apparatus of claim 10 wherein said chamber is sized such that the ratio of the volume of the chamber to the volume of the tube is at least equal to the ratio of the difference between the maximum and minimum anticipated pressures in the borehole to the minimum anticipated pressure.

12. The apparatus of claim 11 wherein said tube is a micro tube.

13. A method for continuously measuring the pressure of fluids in a borehole over an extended period, comprising:

inserting a tube attached to an open-ended chamber, whose volume is substantially larger than that of the tube, into the borehole and into the fluid in the area where pressure is to be measured;

charging the tube and a portion of the chamber with a test fluid until said tube and a portion of said chamber are clear of borehole fluids;

sealing said tube to trap said test fluid in said chamber; and thereafter continuously measuring the pressure at the surface of said test fluid in said tube over the extended period.

14. The method of claim 13 further including the step of maintaining said chamber at a fixed depth throughout said extended period.

15. A method of using a borehole apparatus comprising:

a source of pressurized test fluid at the surface of the borehole, a tube connected to the fluid source and extending into the borehole to a location where pressure is to be measured, a chamber connected to the tube for fluid communication and having a volume substantially larger than that of said tube, and means at the surface for measuring the pressure of the test fluid, comprising the steps of:

charging said tube and a portion of said chamber from said test fluid source;

ceasing said charging when a substantial decrease occurs and the rate of pressure increases in said tube;

closing said tube at the surface to trap said test fluid in said tube and said chamber; and monitoring the pressure in said tube over an extended period.

16. The method of claim 15 further including the step of maintaining said tube at a fixed depth over said extended period.

17. A method of measuring the changing pressure of a fluid in a borehole with a microtube running from the surface into the borehole and attached to a chamber, whose volume is substantially larger than that of the microtube, positioned in said borehole fluid and having an end in communication with said borehole fluid, comprising the steps of:

charging said microtube and a portion of said chamber with a test fluid to substantially the same pressure as said borehole fluid;

sealing said microtube at the surface to prevent escape of said test fluid from said microtube and said chamber;

maintaining said chamber at a fixed depth in said borehole for an extended period; and monitoring the pressure in said microtube over said extended period.

18. A method of continuously determining the pressure of fluids in a borehole over an extended period, comprising the steps of:

attaching an open-ended chamber to a tube whose volume is substantially smaller than that of the chamber;

running the tube and chamber from the earth's surface into the borehole such that the upper end of said tube is at the surface and said chamber is positioned with its open end downward in said fluids;

passing a test fluid into the surface end of said tube;

detecting the rate of pressure change in said tube and chamber;

ceasing passing of the test fluid into said tube when a substantial decrease occurs in the rate of pressure increase;

exhausting a predetermined portion of the test fluid to permit a portion of the chamber to be refilled with borehole fluids;

closing said tube at the surface to further fluid passage; and detecting changes in the pressure of a test fluid in said tube over an extended period.

19. The method of claim 18 further including the step of maintaining said chamber at a fixed depth throughout said extended period.

20. Apparatus for measuring the borehole fluid pressure in flowing, pumping and static fluid wells wherein the pressure is greater than the normal hydrostatic pressure, said apparatus comprising:

an enlarged chamber for positioning within said borehole at a location adjacent the desired pressure measurement, said chamber being in communication with well fluids near its lower portion; a tube extending from communication with said chamber near its upper portion to the surface of said borehole, the volume of said tube being substantially less than the volume of said chamber;

particle filters between said chamber and both said tube and said borehole fluids;

and means for initially charging said tube and a portion of chamber volumes with the gaseous fluid to exhaust a portion of the fluids from within said system and provide a long term continuous indication of borehole pressure at said location regardless of fluctuations therein and inhibit wellbore fluids from entering said tube.

21. Apparatus for continuously measuring the fluctuating pressure of fluids in a borehole over an extended period, comprising:

a tubing string positioned in the borehole;

a chamber positioned in the borehole fluids at a fixed depth, the interior of the chamber being in communication with said borehole fluids on its lower side, said chamber being formed about the tubing string in an annular configuration;

a sealed tube in fluid communication with the upper side of said chamber and extending to the surface;

a test fluid filling the tube and a portion of the volume of said chamber; and means at the surface in fluid communication with said tube for sensing the fluid pressure therein.

22. Apparatus for continuously measuring the fluctuating pressure of fluids in a borehole over an extended period, comprising:

a chamber positioned in the borehole fluids at a fixed depth, the interior of the chamber being in communication with said borehole fluids on its lower side;

a sealed tube in fluid communication with the upper side of said chamber and extending to the surface;

particle filters both between said chamber and both said tube and said borehole fluids;

a test fluid filling the tube and a portion of the volume of said chamber; and means at the surface in fluid communication with said tube for sensing the fluid pressure therein.

* * * * *